(12) United States Patent
Shimizu

(10) Patent No.: US 12,258,499 B2
(45) Date of Patent: Mar. 25, 2025

(54) PEELING METHOD

(71) Applicant: NITTO DENKO CORPORATION, Ibaraki (JP)

(72) Inventor: Yosuke Shimizu, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 50 days.

(21) Appl. No.: 18/032,446

(22) PCT Filed: Oct. 13, 2021

(86) PCT No.: PCT/JP2021/037973
§ 371 (c)(1),
(2) Date: Apr. 18, 2023

(87) PCT Pub. No.: WO2022/085546
PCT Pub. Date: Apr. 28, 2022

(65) Prior Publication Data
US 2023/0392044 A1 Dec. 7, 2023

(30) Foreign Application Priority Data
Oct. 19, 2020 (JP) .................. 2020-175486

(51) Int. Cl.
*B32B 43/00* (2006.01)
*C09J 5/00* (2006.01)
(Continued)

(52) U.S. Cl.
CPC .............. *C09J 5/00* (2013.01); *B32B 43/006* (2013.01); *C09J 7/385* (2018.01); *C09J 11/06* (2013.01);
(Continued)

(58) Field of Classification Search
CPC ............ B32B 43/006; Y10T 156/1158; Y10T 156/1917
See application file for complete search history.

(56) References Cited

U.S. PATENT DOCUMENTS

2013/0084459 A1* 4/2013 Larson ................ C09D 133/16
438/758
2013/0199732 A1 8/2013 Niwa et al.
(Continued)

FOREIGN PATENT DOCUMENTS

JP 2004-339285 A 12/2004
JP 2011-213969 A 10/2011
(Continued)

OTHER PUBLICATIONS

International Search Report issued on Dec. 14, 2021, for corresponding International Patent Application No. PCT/JP2021/037973, along with an English translation (7 pages).
(Continued)

*Primary Examiner* — Philip C Tucker
*Assistant Examiner* — Nickolas R Harm
(74) *Attorney, Agent, or Firm* — HAUPTMAN HAM, LLP

(57) ABSTRACT

The present invention is a method for peeling an adherend from a pressure-sensitive adhesive layer by irradiating a laminate in which the pressure-sensitive adhesive layer and the adherend are laminated with light, the peeling method includes a step of irradiating the pressure-sensitive adhesive layer with the light having a pulse width of 1 second or less and a light irradiation amount of 1,000 mJ/cm² or more, and the pressure-sensitive adhesive layer satisfies predetermined conditions in terms of a minimum transmittance in a near-infrared region of a wavelength of 800 nm to 2,500 nm and
(Continued)

a maximum transmittance in a visible light region of a wavelength of 380 nm to 780 nm.

7 Claims, 4 Drawing Sheets

(51) Int. Cl.
    *C09J 7/38*         (2018.01)
    *C09J 11/06*      (2006.01)

(52) U.S. Cl.
    CPC . *B32B 2310/0825* (2013.01); *C09J 2301/302* (2020.08); *C09J 2301/408* (2020.08); *C09J 2301/414* (2020.08); *C09J 2301/416* (2020.08); *C09J 2301/502* (2020.08); *C09J 2400/146* (2013.01); *C09J 2433/00* (2013.01); *Y10T 156/1158* (2015.01); *Y10T 156/1917* (2015.01)

(56) References Cited

U.S. PATENT DOCUMENTS

| | | | | |
|---|---|---|---|---|
| 2014/0138032 A1* | 5/2014 | Kweon | ................ | G02F 1/1303 156/753 |
| 2014/0326416 A1* | 11/2014 | Landru | ................ | B32B 43/006 156/712 |
| 2015/0083343 A1* | 3/2015 | Fujii | .................... | B32B 43/006 156/753 |
| 2015/0325465 A1* | 11/2015 | Iwata | ................. | B32B 38/1858 156/718 |
| 2016/0332436 A1* | 11/2016 | Tang | ...................... | B32B 38/10 |
| 2017/0158916 A1 | 6/2017 | Akiyama et al. | | |

FOREIGN PATENT DOCUMENTS

| | | |
|---|---|---|
| JP | 2012-118433 A | 6/2012 |
| JP | 2013-159743 A | 8/2013 |
| JP | 2016-77988 A | 5/2016 |
| JP | 2017-45829 A | 3/2017 |
| WO | 2009/017160 A1 | 2/2009 |
| WO | 2016/039277 A1 | 3/2016 |

OTHER PUBLICATIONS

Written Opinion issued on Dec. 14, 2021, for corresponding International Patent Application No. PCT/JP2021/037973 (3 pages).

Office Action issued on Nov. 19, 2024 for corresponding Taiwanese Patent Application No. 110138509, along with an English translation (7 pages).

\* cited by examiner

PEELING METHOD

CROSS REFERENCE TO RELATED APPLICATION

This application is a National Stage of International Application No. PCT/JP2021/037973, filed on Oct. 13, 2021, which designates the United States and was published in Japan, and which is based upon and claims priority to Japanese Patent Application No. 2020-175486, filed on Oct. 19, 2020 in the Japan Patent Office. All of the aforementioned applications are hereby incorporated by reference in their entireties.

TECHNICAL FIELD

The present invention relates to a method for peeling an adherend from a pressure-sensitive adhesive layer by irradiating a laminate in which the pressure-sensitive adhesive layer and the adherend are laminated with high energy light.

BACKGROUND ART

As is well known, a laminate obtained by bonding adherends by a pressure-sensitive adhesive layer has been widely used in various fields. On the other hand, in recent years, there has been a growing demand for resource saving and recycling because of an increase in environmental awareness and cost reduction. For example, in fields of automobiles, machines, electrical appliances, building materials, and the like, improvements in yield, reworkability, recyclability, workability, and the like in a step are required.

Among them, when the adherend in the laminate is a very brittle material or a hard material, there is a problem that the reworkability is remarkably deteriorated. For example, from the viewpoint of product design, the pressure-sensitive adhesive layer is required to have a sufficient pressure-sensitive adhesive force, but when at least one of the adherends is made of a hard material such as glass, the adherend cannot be bent in a peeling direction, and peeling of the two is normally difficult in consideration of glass breakage and the like.

As a technique in a related art for peeling the adherend from the pressure-sensitive adhesive layer, for example, Patent Literature 1 below discloses a peeling method of a pressure-sensitive adhesive laminate in which a pressure-sensitive adhesive body including at least a pressure-sensitive adhesive layer containing thermally expandable fine particles and an adherend are laminated, in which the pressure-sensitive adhesive laminate contains a dye component, the dye component is irradiated with a laser beam having a wavelength corresponding to an absorption wavelength of the dye component, and heat generated thereby causes the thermally expandable fine particles to expand, thereby peeling the adherend from the pressure-sensitive adhesive body.

Patent Literature 2 below discloses a method for manufacturing a composite electronic component, the method including: a step of forming a temporary adhesive layer containing a material that is softened or decomposed by irradiation with light on a substrate; a step of applying a conductive ink onto the temporary adhesive layer; a step of baking the conductive ink to form a wiring layer; a step of bonding an insulator member onto the wiring layer; and, after the step of bonding the insulator member, a step of softening or decomposing the temporary adhesive layer by irradiating the temporary adhesive layer with the light, and peeling, from the temporary adhesive layer, the insulator member to which the wiring layer is bonded.

CITATION LIST

Patent Literature

Patent Literature 1: JP2013-159743A
Patent Literature 2: JP2017-45829A

SUMMARY OF INVENTION

Technical Problem

However, in the technique disclosed in Patent Literature 1, since it is necessary to scan a spot-shaped laser beam and to apply the laser beam to an entire surface of a pressure-sensitive adhesive and a process takes time, there is room for further improvement.

The irradiation of the light to the temporary adhesive layer in Patent Literature 2 is specifically to irradiate the entire surface of the temporary adhesive layer with flash light from a xenon flash lamp to soften or decompose an acrylic urethane resin contained in the temporary adhesive layer, whereby the insulator member is peeled from the temporary adhesive layer.

However, in the technique disclosed in Patent Literature 2, in order to quickly soften or decompose the temporary adhesive layer, the temporary adhesive layer is required to substantially contain 1 wt % or more of carbon black as a flash light absorbing material. The flash light absorbing material such as carbon black has a property of absorbing general visible light, and when optical transparency is required for the laminate, such a light absorbing material cannot be used for the pressure-sensitive adhesive layer, and a countermeasure is required.

Accordingly, an object of the present invention is to provide a method in which an adherend can be easily peeled from a pressure-sensitive adhesive layer by irradiation with high energy light while a laminate including the adherend and the pressure-sensitive adhesive layer has good optical transparency in a visible light region.

Solution To Problem

The present invention is as follows.

[1] A method for peeling an adherend from a pressure-sensitive adhesive layer by irradiating a laminate in which the pressure-sensitive adhesive layer and the adherend are laminated with light, the method including:
a step of irradiating the pressure-sensitive adhesive layer with the light having a pulse width of 1 second or less and a light irradiation amount of 1,000 mJ/cm$^2$ or more, in which
the pressure-sensitive adhesive layer satisfies the following conditions (1) and (2) in terms of a minimum transmittance in a near-infrared region of a wavelength of 800 nm to 2,500 nm and a maximum transmittance in a visible light region of a wavelength of 380 nm to 780 nm, which are measured using a measurement sample in which non-alkali glass having a thickness of 0.7 mm is bonded to one pressure-sensitive adhesive surface of the pressure-sensitive adhesive layer and the other pressure-sensitive adhesive surface thereof with the pressure-sensitive adhesive layer interposed therebetween:
(1) the minimum transmittance is 75% or less, and
(2) a value obtained by dividing the maximum transmittance by the minimum transmittance is 1.15 or more.

[2] The peeling method according to [1], in which the light is emitted a plurality of times.

[3] The peeling method according to [1] or [2], in which the light has a peak top in the near-infrared region of the wavelength of 800 nm to 2,500 nm.

[4] The peeling method according to any one of [1] to [3], in which the light irradiation amount of the light is 1,000 mJ/cm$^2$ to 100,000 mJ/cm$^2$.

[5] The peeling method according to any one of [1] to [4], in which the pressure-sensitive adhesive layer contains an acrylic pressure-sensitive adhesive. [6] The peeling method according to any one of [1] to [5], in which the pressure-sensitive adhesive layer contains a near-infrared absorbing material.

[7] The peeling method according to [6], in which the near-infrared absorbing material is a near-infrared absorbing dye.

ADVANTAGEOUS EFFECTS OF INVENTION

According to the present invention, it is possible to provide a method in which an adherend can be easily peeled from a pressure-sensitive adhesive layer by irradiation with high energy light while a laminate in which the pressure-sensitive adhesive layer and the adherend are laminated has good optical transparency in a visible light region.

DESCRIPTION OF EMBODIMENTS

Hereinafter, preferred embodiments of the present invention will be described with reference to the appended drawings. Hereinafter, only preferred embodiments of the present invention will be described for the sake of convenience of description, but of course, the present invention is not intended to be limited thereto.

Figure 1:
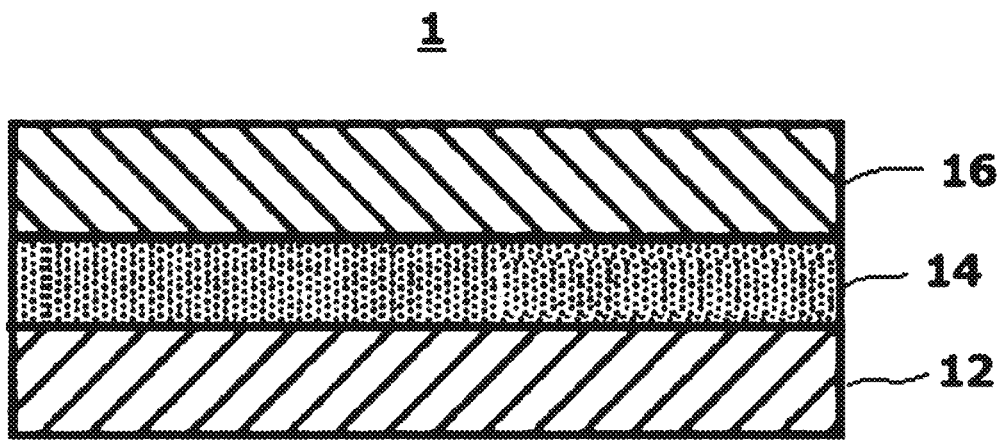
FIG. 1 is a cross-sectional view of a laminate illustrating a peeling method according to an embodiment of the present invention.

FIG. 1 is a cross-sectional view of a laminate illustrating a peeling method according to an embodiment of the present invention.

In FIG. 1, a laminate 1 in the present embodiment is formed by laminating an adherend 12 and an adherend 16 via a pressure-sensitive adhesive layer 14, and irradiates the laminate 1 with light to peel the adherend 12 and the adherend 16 from the pressure-sensitive adhesive layer 14.

In the present embodiment, the pressure-sensitive adhesive layer 14 is irradiated with light (also referred to as high energy light) having a pulse width of 1 second or less and a light irradiation amount of 1,000 mJ/cm$^2$ or more, and the pressure-sensitive adhesive layer 14 satisfies the following conditions (1) and (2) in terms of a minimum transmittance in a near-infrared region of a wavelength of 800 nm to 2,500 nm and a maximum transmittance in a visible light region of a wavelength of 380 nm to 780 nm, which are measured using a measurement sample in which non-alkali glass having a thickness of 0.7 mm is bonded to one pressure-sensitive adhesive surface of the pressure-sensitive adhesive layer and the other pressure-sensitive adhesive surface thereof with the pressure-sensitive adhesive layer interposed therebetween:

(1) the minimum transmittance is 75% or less, and
(2) a value obtained by dividing the maximum transmittance by the minimum transmittance is 1.15 or more.

In the peeling method according to the present embodiment, when the adherends are laminated on both surfaces of the pressure-sensitive adhesive layer, at least one of the adherends is peeled. That is, only one adherend may be peeled, or both the adherends may be peeled.

Although the laminate 1 in FIG. 1 shows an aspect in which the adherends are laminated on both the surfaces of the pressure-sensitive adhesive layer, a substrate, a release sheet, or the like may be provided instead of one of the adherends. In this case, only the other adherend is peeled from the pressure-sensitive adhesive layer 14 by the peeling method in the present embodiment.

Although the laminate 1 of FIG. 1 has a three-layer structure in which the adherend 12, the pressure-sensitive adhesive layer 14, and the adherend 16 are laminated, as long as the pressure-sensitive adhesive layer and the adherend are at least partially in contact with each other, the peeling method according to the present embodiment can be applied. Therefore, there is no limit to the number of laminated layers, and the laminate may be a laminate having a total of four layers or more with any layers interposed.

Pressure-sensitive Adhesive Layer

The pressure-sensitive adhesive layer 14 in the present embodiment is not particularly limited as long as the pressure-sensitive adhesive layer 14 satisfies the conditions (1) and (2). Typical examples of a pressure-sensitive adhesive constituting the pressure-sensitive adhesive layer include an acrylic pressure-sensitive adhesive, a urethane-based pressure-sensitive adhesive, and a rubber-based pressure-sensitive adhesive.

Among these, the acrylic pressure-sensitive adhesive containing an acrylic polymer is preferable from the viewpoint of excellent transparency. The acrylic pressure-sensitive adhesive typically contains a (meth)acrylic polymer as a main component. In the present specification, the term "main component" refers to a component having the largest content among all components, and means, for example, a component that accounts for 50% by mass or more of all the components.

The (meth)acrylic polymer may be contained in a pressure-sensitive adhesive composition in a ratio of, for example, 50% by mass or more, preferably 70% by mass or more, and more preferably 90% by mass or more, based on a solid content of the pressure-sensitive adhesive composition. The (meth)acrylic polymer contains, as a main component, alkyl (meth)acrylate as a monomer unit. The term "(meth)acrylate" refers to acrylate and/or methacrylate.

Examples of the alkyl (meth)acrylate constituting a main skeleton of the (meth)acrylic polymer include those having 1 to 18 carbon atoms in a linear or branched alkyl group.

Examples of the alkyl group include a methyl group, an ethyl group, a propyl group, an isopropyl group, a butyl group, an isobutyl group, an amyl group, a hexyl group, a cyclohexyl group, a heptyl group, a 2-ethylhexyl group, an isooctyl group, a nonyl group, a decyl group, an isodecyl group, a dodecyl group, an isomyristyl group, a lauryl group, a tridecyl group, a pentadecyl group, a hexadecyl group, a heptadecyl group, and an octadecyl group. These can be used alone or in combination. An average number of carbon atoms of these alkyl groups is preferably 3 to 9.

In addition to the monomer units of the alkyl (meth)acrylate, a functional group-containing monomer such as a carboxyl group-containing monomer, a hydroxyl group-containing monomer, and an amide group-containing monomer can be introduced into the (meth)acrylic polymer in order to improve an adhesive property and heat resistance.

The carboxyl group-containing monomer is a compound containing a carboxyl group in a structure thereof and containing a polymerizable unsaturated double bond such as a (meth)acryloyl group or a vinyl group.

Specific examples of the carboxyl group-containing monomer include (meth)acrylic acid, carboxyethyl (meth)acrylate, carboxypentyl (meth)acrylate, itaconic acid, maleic acid, fumaric acid, and crotonic acid.

Among the carboxyl group-containing monomers, acrylic acid is preferable from the viewpoints of copolymerizability, a price, and a pressure-sensitive adhesive property.

The hydroxyl group-containing monomer is a compound containing a hydroxyl group in a structure thereof and containing a polymerizable unsaturated double bond such as a (meth)acryloyl group or a vinyl group.

Specific examples of the hydroxyl group-containing monomer include hydroxyalkyl (meth)acrylates such as 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, and 12-hydroxylauryl (meth)acrylate; and (4-hydroxymethylcyclohexyl)-methyl acrylate.

Among the hydroxyl group-containing monomers, 2-hydroxyethyl (meth)acrylate and 4-hydroxybutyl (meth)acrylate are preferable, and 4-hydroxybutyl (meth)acrylate is particularly preferable from the viewpoint of durability.

The amide group-containing monomer is a compound containing an amide group in a structure thereof and containing a polymerizable unsaturated double bond such as a (meth)acryloyl group or a vinyl group.

Specific examples of the amide group-containing monomer include an acrylamide monomer such as (meth)acrylamide, N,N-dimethyl (meth)acrylamide, N,N-diethyl (meth)acrylamide, N-isopropyl acrylamide, N-methyl (meth)acrylamide, N-butyl (meth)acrylamide, N-hexyl (meth)acrylamide, N-methylol (meth)acrylamide, N-methylol-N-propane (meth)acrylamide, aminomethyl (meth)acrylamide, aminoethyl (meth)acrylamide, mercaptomethyl (meth)acrylamide, and mercaptoethyl (meth)acrylamide; an N-acryloyl heterocyclic monomer such as N-(meth)acryloylmorpholine, N-(meth)acryloylpiperidin, and N-(meth)acryloylpyrrolidine; and an N-vinyl group containing lactam monomer such as N-vinyl pyrrolidone and N-vinyl-c-caprolactam.

The pressure-sensitive adhesive layer 14 preferably contains a near-infrared absorbing material. According to this embodiment, in a case in which the high energy light has a peak top in the near-infrared region of the wavelength of 800 nm to 2,500 nm, when such high energy light is applied to the pressure-sensitive adhesive layer 14, the pressure-sensitive adhesive contained in the pressure-sensitive adhesive layer 14 can be easily decomposed or softened, and the adherend can be more easily peeled from the pressure-sensitive adhesive layer 14.

Typical examples of the near-infrared absorbing material include a near-infrared absorbing dye. The near-infrared absorbing dye is not particularly limited as long as the near-infrared absorbing dye can absorb light in the near-infrared region of the wavelength of 800 nm to 2,500 nm.

Examples of the near-infrared absorbing material include known cyanine dyes, phthalocyanine dyes, naphthalocyanine dyes, immonium dyes, aminium dyes, quinolium dyes, pyrylium dyes, Ni complex dyes, pyrrolopyrrole dyes, copper complex dyes, quaterrylene-based dyes, azo-based dyes, anthraquinone-based dyes, diimmonium-based dyes, squarylium-based dyes, and porphyrin-based dyes. Of these, the diimmonium-based dyes are preferred.

In the present embodiment, the diimmonium-based dye may be an amorphous body of a diimmonium salt represented by the following Formula (1).

[Chem. 1]

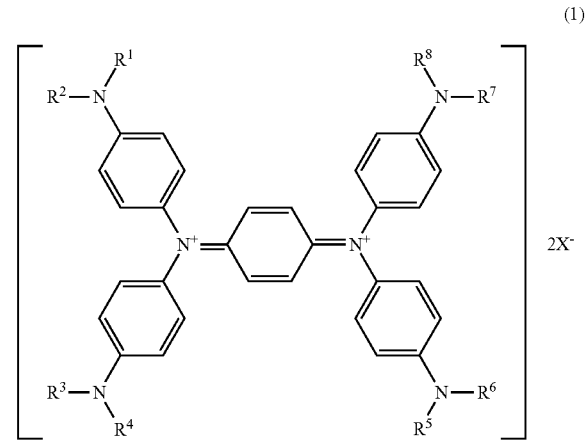

In Formula (1), $R^1$ to $R^8$ represent monovalent organic groups which may be the same or different, and $X^-$ represents an anion.

In the present specification, the term "amorphous body" refers to a state in which atoms or molecules are in a solid state without forming crystals having regular periodic arrangement. The presence or absence of the crystallinity of the solid is determined by measuring a diffraction pattern using a powder X-ray diffractometer. That is, the amorphous body is a state in which a clear diffraction peak indicating the crystallinity is not detected in the diffraction pattern obtained by the powder X-ray diffractometer.

For example, the diffraction peak is measured by the powder X-ray diffractometer, and a detected peak having the maximum strength has a peak half width of $2\theta=1°$ or more when the peak top is taken from the baseline. Such a solid does not substantially contain a crystal, and is composed of only an amorphous body.

In a case in which the amorphous body of the diimmonium salt (1) is used as the near-infrared absorbing dye, the pressure-sensitive adhesive layer 14 has high heat resistance and high humidity and heat resistance, and is excellent in transparency when containing the amorphous body as compared with a state of having crystallinity such as crystals or aggregates.

Preferred examples of the organic group of $R^1$ to $R^8$ include a linear or branched $C_{1-10}$ alkyl group which may be substituted with a halogen atom, a $C_{3-12}$ cycloalkyl group, or a $C_{3-12}$ cycloalkyl-$C_{1-10}$ alkyl group which may be substituted with a cycloalkyl ring.

Examples of the linear or branched $C_{1-10}$ alkyl group include a methyl group, an ethyl group, an n-propyl group, an n-butyl group, an n-pentyl group, an n-hexyl group, an iso-propyl group, an iso-butyl group, a sec-butyl group, a tert-butyl group, an n-amyl group, an iso-amyl group, a 1-methylbutyl group, a 2-methylbutyl group, a 1-ethylbutyl group, a 2-ethylbutyl group, a 2-dimethylpropyl group, and a 1,1-dimethylpropyl group.

Among these, an n-propyl group, an n-butyl group, an n-pentyl group, and an n-hexyl group are preferable since the crystallinity of the diimmonium salt (1) is low and the diimmonium salt (1) is likely to become the amorphous body. Further, since such alkyl groups each having a low polarity is contained, these groups are also preferable in that the polarities are close to a polarity of the acrylic pressure-sensitive adhesive, whereby they are easily mixed.

Examples of the $C_{3-12}$ cycloalkyl group include a cyclopentyl group and a cyclohexyl group.

As the $C_{3-12}$ cycloalkyl-$C_{1-10}$ alkyl group, the cycloalkyl ring may be substituted or unsubstituted. Examples of a substituent that may be substituted include an alkyl group, a hydroxyl group, a sulfonic acid group, an alkylsulfonic acid group, a nitro group, an amino group, an alkoxy group, a halogenated alkyl group, and a halogen atom. The cycloalkyl ring is preferably unsubstituted, and a cycloalkyl-alkyl group represented by the following General Formula (3) is preferred since the cycloalkyl-alkyl group has low solubility in the acrylic pressure-sensitive adhesive.

[Chem. 2]

(3)

In the above General Formula (3), A represents a linear or branched alkyl group having 1 to 10 carbon atoms, and m represents an integer of 3 to 12. The number of carbon atoms of A is preferably 1 to 4. Further, m is preferably 5 to 8, and particularly preferably 5 or 6.

Specific examples of the cycloalkyl-alkyl group of General Formula (3) include a cyclopentylmethyl group, a 2-cyclopentylethyl group, a 2-cyclopentylpropyl group, a 3-cyclopentylpropyl group, a 4-cyclopentylbutyl group, a 2-cyclohexylmethyl group, a 2-cyclohexylethyl group, a 3-cyclohexylpropyl group, and a 4-cyclohexylbutyl group, and among these, a cyclopentylmethyl group, a cyclohexylmethyl group, a 2-cyclohexylethyl group, a 2-cyclohexylpropyl group, a 3-cyclohexylpropyl group, and a 4-cyclohexylbutyl group are preferable.

The cycloalkyl-alkyl group represented by General Formula (3) is more preferably the cyclopentylmethyl group or the cyclohexylmethyl group. Particularly, the cyclohexylmethyl group is more preferable because the cyclohexylmethyl group has low solubility in an acrylic resin or the like used in a pressure-sensitive adhesive, a hard coat resin, or the like and has a low polarity.

Examples of the linear or branched $C_{1-10}$ alkyl group substituted with the halogen atom include a halogenated alkyl group such as a 2-halogenoethyl group, a 2,2-dihalogenoethyl group, a 2,2,2-trihalogenoethyl group, a 3-halogenopropyl group, a 3,3-dihalogenopropyl group, a 3,3,3-trihalogenopropyl group, a 4-halogenobutyl group, a 4,4-dihalogenobutyl group, a 4,4,4-trihalogenobutyl group, a 5-halogenopentyl group, a 5,5-dihalogenopentyl group, and a 5,5,5-trifluoropentyl group. Among these, a monohalogenated alkyl group represented by the following General Formula (4) is preferable.

(4)

In the General Formula (4), n represents an integer of 1 to 9, and Y represents a halogen atom.

n is preferably 1 to 4. Further, Y is particularly preferably a fluorine atom. Specific examples of the monohalogenated alkyl group represented by the General Formula (4) include a monofluoroalkyl group such as 2-fluoroethyl group, 3-fluoroethyl group, 4-fluorobutyl group, and 5-fluoropentyl group.

$R^1$ to $R^8$ in General Formula (1) may be the same monovalent organic group, or may be two or more different monovalent organic groups, and preferably two different monovalent organic groups. In particular, it is preferable that combinations of $R^1$ and $R^2$, $R^3$ and $R^4$, $R^5$ and $R^6$, and $R^7$ and $R^8$ are combinations of two different monovalent organic groups. That is, the diimmonium salt (1) in which two monovalent organic groups in each amino group are combinations of two different monovalent organic groups is preferable.

The two monovalent organic groups are preferably a combination of the monovalent organic groups selected from the group consisting of an n-propyl group, an n-butyl group, an n-pentyl group, an n-hexyl group, and a cyclohexylmethyl group. More preferably, one of the monovalent organic groups is the cyclohexylmethyl group, and the other monovalent organic group is a monovalent organic group selected from the group consisting of an n-propyl group, an n-butyl group, an n-pentyl group, and an n-hexyl group.

When the monovalent organic groups of one amino group is a combination of two different monovalent organic groups, the crystallinity of the diimmonium salt (1) is lowered, and is likely to become the amorphous body. In particular, when one of the two monovalent organic groups is the cyclohexylmethyl group, since the crystallinity is lowered due to steric hindrance, the diimmonium salt is more likely to become the amorphous body, which is preferable.

$X^-$ in General Formula (1) is an anion necessary for neutralizing electric charge of a diimmonium cation, and an organic acid anion, an inorganic anion or the like can be used.

Specific examples of the anion include: a halogen ion such as a fluorine ion, a chlorine ion, a bromide ion, and an iodide ion; a perchlorate ion; a periodate ion; a tetrafluoroborate ion; a hexafluorophosphate ion; a hexafluoro antimonate ion; a bis(trifluoromethanesulfonyl)imide acid ion; and a bis(fluorosulfonyl)imide acid ion.

Among these, the tetrafluoroborate ion, the hexafluorophosphate ion, the hexafluoro antimonate ion, the bis(trifluoromethanesulfonyl)imide acid ion, and the bis(fluorosulfonyl)imide acid ion are particularly preferably used as anions. This is because the heat resistance, the humidity and heat resistance, and the like of the obtained pressure-sensitive adhesive layer can be improved.

In particular, since the hexafluorophosphate ion, the hexafluoro antimonate ion, and the bis(fluorosulfonyl)imide acid ion have a large inorganic property, the obtained diimmonium salt has low solubility in the acrylic pressure-sensitive adhesive, which is preferable.

Specifically, as the diimmonium salt (1), hexafluorophosphate-N,N,N',N'-tetrakis{p-di(cyclohexylmethyl)aminophenyl}-p-phenylenediimmonium, hexafluoroantimonate-N,N,N',N'-tetrakis{p-di(cyclohexylmethyl)aminophenyl}-p-phenylenediimmonium, bis(trifluoromethanesulfonyl)imide acid-N,N,N',N'-tetrakis{p-di(cyclohexylmethyl)aminophenyl}-p-phenylenediimmonium, bis(fluorosulfonyl)imide acid-N,N,N',N'-tetrakis{p-di (cyclohexylmethyl)aminophenyl}-p-phenylenediimmonium, hexafluorophosphate-N,N,N',N'-tetrakis{p-di(n-propyl)aminophenyl}-p-phenylenediimmonium, hexafluoro antimonate-N,N,N',N'-tetrakis{p-di(n-propyl)aminophenyl}-p-phenylenediimmonium, bis(trifluoromethanesulfonyl)imide acid-N,N,N',N'-tetrakis{p-di(n-propyl)aminophenyl}-p-phenylenediimmonium, bis(fluorosulfonyl)imide acid-N,N,N'N'-tetrakis{p-di(n-propyl)aminophenyl}-p-phenylenediimmonium, hexafluorophosphate-N,N,N',N'-tetrakis{p-di(n-butyl)aminophenyl}-p-phenylenediimmonium, hexafluoro antimonate-N,N,N',N'-tetrakis{p-di(n-butyl)aminophenyl}-p-phenylenediimmonium, bis(trifluoromethanesulfonyl)imide acid-N,N,N',N'-tetrakis{p-di(n-butyl)aminophenyl}-p-phenylenediimmonium, bis(fluorosulfonyl)imide acid-N,N,N',N'-tetrakis{p-di(n-butyl)aminophenyl}-p-phenylenediimmonium, hexafluoroantimonate-N,N,N',N'-tetrakis{p-di(n-pentyl)aminophenyl}-p-phenylenediimmonium, bis(fluorosulfonyl)imide acid-N,N,N',N'-tetrakis {p-di(n-pentyl}aminophenyll-p-phenylenediimmonium, hexafluorophosphate-N,N,N',N'-tetrakis{p-(cyclohexylmethyl-n-propyl)aminophenyl}-p-phenylenediimmonium, bis(fluorosulfonyl)imide acid-N,N,N',N'-tetrakis{p-(cyclohexylmethyl-n-propyl)aminophenyl}-p-phenylenediimmonium, hexafluorophosphate-N,N,N',N'-tetrakis{p-(cyclohexylmethyl-n-butyl)aminophenyl}-p-phenylenediimmonium, bis(fluorosulfonyl)imide acid-N,N,N',N'-tetrakis{p-(cyclohexylmethyl-n-butyl)aminophenyl}-p-phenylenediimmonium, hexafluorophosphate-N,N,N',N'-tetrakis {p-(cyclohexylmethyl-n-pentyl)aminophenyl}-p-phenylenediimmonium, and bis(fluorosulfonyl)imide acid-N,N,N',N'-tetrakis {p-(cyclohexylmethyl-n-pentyl) aminophenyl}-p-phenylenediimmonium are excellent in heat resistance, humidity and heat resistance, and transparency, which is preferable.

Among these, hexafluorophosphate-N,N,N',N'-tetrakis{p-dicyclohexylmethyllaminophenyl}-p-phenylenediimmonium, bis(trifluoromethanesulfonyl)imide acid-N,N,N',N'-tetrakis{p-di(cyclohexylmethyllaminophenyl}-p-phenylenediimmonium, bis(fluorosulfonyl)imide acid-N,N,N',N'-tetrakis{p-di(cyclohexylmethyl)aminophenyl}-p-phenylenediimmonium, hexafluorophosphate-N,N,N',N'-tetrakis{p-di(n-propyl)aminophenyl}-p-phenylenediimmonium, hexafluoro antimonate-N,N,N' ,N'-tetrakis{p-di(n-butyl)aminophenyl}-p-phenylenediimmonium, bis(fluorosulfonyl)imide acid-N,N,N',N'-tetrakis{p-di(n-butyl)aminophenyl}-p-phenylenediimmonium, hexafluoroantimonate-N,N,N',N'-tetrakis{p-di(n-pentyl)aminophenyl}-p-phenylenediimmonium, hexafluorophosphate-N,N,N',N'-tetrakis{p-(cyclohexylmethyl-n-propyl)aminophenyl}-p-phenylenediimmonium, and hexafluorophosphate-N,N,N',N'-tetrakis{p-(cyclohexylmethyl-n-butyl)aminophenyl}-p-phenylenediimmonium have low crystallinity and are more likely to become amorphous bodies, which are particularly preferable.

The diimmonium-based dye used in the present embodiment is obtained by dry-grinding a crystalline solid of the diimmonium salt (1) and amorphizing the crystalline solid. The crystalline solid of the diimmonium salt (1) can be produced by a known method in the related art, for example, a method described in WO2011/074619. The amorphization performed by dry-grinding of the crystalline solid of diimmonium salt (1) may be performed by the method described in WO2011/074619.

As the diimmonium-based dye, a commercially available product, for example, trade name CIR-RL (bis(trifluoromethanesulfonyl)imide acid salt) or CIR-FS265 and the like manufactured by Japan Calit Co., Ltd. may be used.

The pressure-sensitive adhesive layer 14 may contain, as the diimmonium-based dye, one of the amorphous bodies of the diimmonium salt (1) alone or a combination of two or more thereof.

The content of the near-infrared absorbing dye in the pressure-sensitive adhesive layer 14 is, for example, 50% by mass or less, preferably 20% by mass or less, more preferably 10% by mass or less, still more preferably 5% by mass or less, yet still more preferably 2% by mass or less, even still more preferably 1% by mass or less, and particularly preferably 0.1% by mass or less with respect to 100% by mass of the pressure-sensitive adhesive composition that forms the pressure-sensitive adhesive layer 14.

The content of the near-infrared absorbing dye in the pressure-sensitive adhesive layer 14 is, for example, 0.01% by mass or more, preferably 0.05% by mass or more, and more preferably 0.1% by mass or more with respect to 100% by mass of the pressure-sensitive adhesive composition.

The pressure-sensitive adhesive layer 14 may further contain a polymerization initiator such as a thermal polymerization initiator or a photopolymerization initiator.

The thermal polymerization initiator is not particularly limited, and examples thereof include an azo-based polymerization initiator, a peroxide-based initiator, a redox-based initiator obtained by a combination of peroxide and a reducing agent, a substituted ethane-based initiator, and the like.

More specifically, examples thereof include an azo-based initiator such as 2,2'-azobisisobutyronitrile(AIBN), 2,2'-azobis(2-methylpropionamidine)disulfate, 2,2'-azobis(2-amidinopropane)dihydrochloride, 2,2'-azobis[2-(5-methyl-2-imidazoline-2-yl)propane]dihydrochloride, 2,2'-azobis(N,N'-dimethylene isobutyramidine), and 2,2'-azobis[N-(2-carboxyethyl)-2-methylpropionamidine]hydrate; a persulfate salt such as potassium persulphate and ammonium persulfate; a peroxide-based initiator such as benzoyl peroxide, t-butyl hydroperoxide, and hydrogen peroxide; a substituted ethane-based initiator such as phenyl-substituted ethane; and a redox-based initiator such as a combination of a persulfate salt and sodium bisulfite, and a combination of peroxide and sodium ascorbate.

The photopolymerization initiator is not particularly limited, and examples thereof include a benzoin ether-based photopolymerization initiator, an acetophenone-based photopolymerization initiator, an α-ketol-based photopolymerization initiator, an aromatic sulfonyl chloride-based photopolymerization initiator, a photo-active oxime-based photopolymerization initiator, a benzoin-based photopolymerization initiator, a benzyl-based photopolymerization initiator, a benzophenone-based photopolymerization initiator, a ketal-based photopolymerization initiator, and a thioxanthone-based photopolymerization initiator.

Specific examples of a ketal-based photopolymerization initiator include 2,2-dimethoxy-1,2-diphenylethane-1-one (trade name: "Irgacure 651", manufactured by BASF Japan Ltd.).

Examples of the α-hydroxyketone-based photopolymerization initiator include 1-hydroxy-cyclohexyl-phenyl ketone (trade name: "Irgacure 184", manufactured by BASF Japan Ltd.), 2-hydroxy-2-methyl-1-phenyl-propan-1-one (trade name: "Darocur 1173", manufactured by BASF Japan Ltd.), 1-[4-(2-hydroxyethoxy)-phenyl]-2-hydroxy-2-methyl-1-propan-1-one (trade name: "Irgacure 2959", manufactured by BASF Japan Ltd.), and the like.

Examples of the α-aminoketone-based photopolymerization initiator include 2-methyl-1-[4-(methylthio)phenyl]-2-morpholinopropan-1-one (trade name: "Irgacure 907", manufactured by BASF Japan Ltd.), and 2-benzyl-2-dimethylamino-1-(4-morphorinophenyl)-butanone-1 (trade name "Irgacure 369", manufactured by BASF Japan Ltd.).

Examples of an acyl phosphine oxide-based photopolymerization initiator include 2,4,6-trimethylbenzoyldiphenylphosphine oxide (trade name "Lucirin TPO", manufactured by BASF Japan Ltd.).

Examples of a benzoin ether-based photopolymerization initiator include benzoin methyl ether, benzoin ethyl ether, benzoin proply ether, benzoin isopropyl ether, benzoin isobutyl ether, 2,2-dimethoxy-1,2-diphenylethane- 1-one, and anisole methyl ether.

Examples of an acetophenone-based photopolymerization initiator include 2,2-diethoxy acetophenone, 2,2-dimethoxy-2-phenylacetophenone, 1-hydroxycyclohexyl phenyl ketone, 4-phenoxy dichloroacetophenone, and 4-t-butyl-dichloroacetophenone.

Examples of an aromatic sulfonyl chloride-based photopolymerization initiator include 2-naphthalene sulfonyl chloride.

Examples of the photo-active oxime-based photopolymerization initiator include 1-phenyl-1,1-propanedione-2-(o-ethoxycaxbonyl)-oxime.

Examples of a benzoin-based photopolymerization initiator include benzoin.

Examples of the benzyl-based photopolymerization initiator include benzyl.

Examples of the benzophenone-based photopolymerization initiator include benzophenone, benzoyl benzoic acid, 3,3'-dimethyl-4-methoxybenzophenone, polyvinylbenzophenone, and a-hydroxycyclohexyl phenyl ketone.

Examples of the ketal-based photopolymerization initiator include benzyl dimethyl ketal.

Examples of a thioxanthone-based photopolymerization initiator include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, and dodecylthioxanthone.

In the pressure-sensitive adhesive layer 14, a content of the polymerization initiator is not particularly limited depending on a type thereof. For example, when an acrylic pressure-sensitive adhesive composition is used, the content of the polymerization initiator is preferably 0.001 parts by weight to 5 parts by weight, more preferably 0.01 parts by weight to 5 parts by weight, still more preferably 0.05 parts by weight to 3 parts by weight with respect to 100 parts by weight of the (meth)acrylic polymer.

The pressure-sensitive adhesive layer 14 may contain another functional monomer containing a monomer having two or more ethylenically unsaturated bonds in a molecule, from the viewpoint of adjusting elasticity and flexibility of the pressure-sensitive adhesive layer 14, increasing cohesive strength, and improving pressure-sensitive adhesive force.

Examples of a polyfunctional monomer include trimethylolpropane tri(meth)acrylate, tetramethylol methane tetra(meth)acrylate, pentaerythritol di(meth)acrylate, pentaerythritol tri(meth)acrylate, pentaerythritol tetra(meth)acrylate, 1,2-ethylene glycol di(meth)acrylate, 1,4-butylene glycol di(meth)acrylate, 1,6-hexanediol di(meth)acrylate, 1,12-dodecandiol di(meth)acrylate, dipentaerythritol monohydroxy penta(meth)acrylate, dipentaerythritol hexa(meth)acrylate, polyethylene glycol di(meth)acrylate, hexanediol di(meth)acrylate, (poly)ethylene glycol di(meth)acrylate, (poly) propylene glycol di(meth)acrylate, neopentyl glycol di(meth)acrylate, tetramethylol methane tri(meth)acrylate, allyl (meth)acrylate, vinyl (meth)acrylate, epoxy acrylate, polyester acrylate, urethane acrylate, and a reactive hyperbranched polymer (for example, trade names: "CN2300", "CN2301", and "CN2320" manufactured by SARTOMER) having a plurality of (meth)acryloyl groups at a terminal.

In the pressure-sensitive adhesive layer 14, a content of the polyfunctional monomer is not particularly limited. For example, when the acrylic pressure-sensitive adhesive composition is used, the content of the polyfunctional monomer is, for example, 0.001 parts by weight to 5 parts by weight, preferably 0.001 parts by weight to 3 parts by weight, and more preferably 0.001 parts by weight to 1 part by weight with respect to 100 parts by weight of the (meth)acrylic polymer.

If necessary, various known additives may be added to the pressure-sensitive adhesive layer 14 as long as effects of the present invention are not impaired.

Examples of the additive include a crosslinking agent such as an isocyanate-based crosslinking agent and an epoxy-based crosslinking agent; a tackifier such as a rosin derivative resin, a polyterpene resin, a petroleum resin, and an oil-soluble phenol resin; a plasticizer; a filler; an antioxidant; a surfactant; and a chain transfer agent. One kind of additive may be contained, or two or more kinds of additives may be contained.

A thickness of the pressure-sensitive adhesive layer 14 is not particularly limited, and is preferably 5,000 μm or less, more preferably 1,000 μm or less, still more preferably 500 μm or less, yet still more preferably 250 μm or less, even still more preferably 100 μm or less, even still more preferably 50 μm or less, even yet still more preferably 25 μm or less, and particularly preferably 10 μm or less, from the viewpoint of achieving both reliability and peelability of the pressure-sensitive adhesive layer 14.

The thickness of the pressure-sensitive adhesive layer 14 is preferably 1 μm or more, more preferably 3 μm or more, still more preferably 5 μm or more, and particularly preferably 8 μm or more. The pressure-sensitive adhesive layer 14 may have a single-layer structure or a laminated structure.

The pressure-sensitive adhesive layer 14 is formed by applying a pressure-sensitive adhesive composition onto the adherend to obtain a pressure-sensitive adhesive composition layer, and then drying or curing (for example, curing by heat or an active energy ray) the pressure-sensitive adhesive composition layer as necessary.

The application, drying, and curing can be performed according to an ordinary method. For example, the pressure-sensitive adhesive composition can be applied using a common coater, for example, a gravure roll coater, a reverse roll coater, a kiss roll coater, a dip roll coater, a bar coater, a knife coater, a spray coater, or the like.

On the other hand, as shown in the following Examples, the pressure-sensitive adhesive composition layer of the pressure-sensitive adhesive layer 14 may be formed on the substrate as described above, a release liner that has been subjected to a release treatment may be laminated to form a pressure-sensitive adhesive sheet, and if necessary, after storage, the release liner may be released off during production, and this pressure-sensitive adhesive sheet and the adherend may be bonded.

The pressure-sensitive adhesive layer 14 in the present embodiment satisfies the following conditions (1) and (2) in terms of the minimum transmittance in the near-infrared region of the wavelength of 800 nm to 2,500 nm and the maximum transmittance in the visible light region of the wavelength of 380 nm to 780 nm, which are measured using the measurement sample in which the non-alkali glass having the thickness of 0.7 mm is bonded to the one pressure-sensitive adhesive surface of the pressure-sensitive adhesive layer and the other pressure-sensitive adhesive surface thereof with the pressure-sensitive adhesive layer interposed therebetween:

(1) the minimum transmittance is 75% or less, and
(2) the value obtained by dividing the maximum transmittance by the minimum transmittance is 1.15 or more.

In other words, the measurement sample is obtained by sandwiching the pressure-sensitive adhesive layer 14 with the non-alkali glass having the thickness of 0.7 mm When the minimum transmittance is more than 75%, the high energy light is not absorbed by the pressure-sensitive adhesive layer 14, and it is difficult to peel the adherend from the pressure-sensitive adhesive layer 14.

The minimum transmittance is preferably 70% or less, more preferably 68% or less, still more preferably 65% or less, yet still more preferably 63% or less, even still more preferably 60% or less, even still more preferably 58% or less, even still more preferably 55% or less, even still more preferably 53% or less, even still more preferably 50% or less, even yet still more preferably 45% or less, and particularly preferably 40% or less. The minimum transmittance is, for example, 0.000001% or more.

When the value obtained by dividing the maximum transmittance by the minimum transmittance is less than 1.15, the high energy light is less likely to be absorbed by the pressure-sensitive adhesive layer 14, whereby it is difficult to peel the adherend from the pressure-sensitive adhesive layer, and it is not possible to easily peel the adherend from the pressure-sensitive adhesive layer by the high energy light while maintaining good optical transparency in the visible light region.

The value obtained by dividing the maximum transmittance by the minimum transmittance is 1.15 or more, preferably 1.20 or more, more preferably 1.25 or more, still more preferably 1.30 or more, yet still more preferably 1.35 or more, even still more preferably 1.40 or more, even still more preferably 1.50 or more, even still more preferably 1.7 or more, even still more preferably 2 or more, even yet still more preferably 3 or more, and particularly preferably 5 or more. A value obtained by dividing the maximum transmittance by the minimum transmittance is, for example, 10,000 or less and 5,000 or less.

The maximum transmittance is preferably 20% or more, more preferably 30% or more, still more preferably 40% or more, yet still more preferably 50% or more, even still more preferably 60% or more, even yet still more preferably 70% or more, even yet still more preferably 80% or more, and particularly preferably 90% or more. The maximum transmittance is, for example, 99.9% or less and 98% or less.

The maximum transmittance and the minimum transmittance in the pressure-sensitive adhesive layer 14 are measured using the measurement sample, and are specifically measured by the method described in Examples.

The condition (1) can be satisfied, for example, by setting the content of the near-infrared absorbing dye in the pressure-sensitive adhesive layer 14 as described above.

The condition (2) can be satisfied, for example, by setting the content of the near-infrared absorbing dye in the pressure-sensitive adhesive layer 14 as described above and not containing a material that absorbs the light in the visible light region of the wavelength of 380 nm to 780 nm, such as carbon black in the pressure-sensitive adhesive layer 14, or by containing a small amount of the material so as to satisfy the condition (2).

Adherend

Examples of the adherend used in the present embodiment include a resin capable of transmitting the high energy light, glass, a silicon wafer, an inorganic material, and a metal material. As shown in FIG. 1, when two or more adherends are used, the adherends may be made of the same material or different materials. Further, as long as the high energy light reaches the pressure-sensitive adhesive layer 14, at least one of the adherends may be made of a material that does not transmit the high energy light.

Examples of a resin in the adherend include a transparent resin including homopolymers or copolymers of a polyethylene terephthalate (PET), a polyethylene naphthalate (PEN), a polybutylene terephthalate, a polyamide, a polyvinyl chloride, a polycarbonate (PC), a cycloolefin polymer (COP), a polystyrene, a polypropylene (PP), a polyethylene, a polycycloolefin, a polyurethane, a polyimide, an acrylic (PMMA), ABS, and the like.

Examples of the glass in the adherend include non-alkali glass, soda glass, borosilicate glass, aluminosilicate glass, and the like.

Examples of an inorganic material in the adherend include an inorganic bulk material and an inorganic thin film, and the inorganic thin film is preferable from the viewpoint of the optical transparency. Examples of the inorganic thin film include a carbon-based thin film such as graphite and graphene, a nitride-based thin film such as boron nitride, and the like.

A thickness of the inorganic thin film is, for example, 0.3 nm or more, 1 nm or more, or 3 nm or more. The thickness of the inorganic thin film is, for example, 10 μm or less, 5 μm or less, or 1 μm or less.

As a metal material in the adherend, for example, a metal thin film is preferably used from the viewpoint of the optical transparency. Examples of the metal thin film include a metal oxide thin film such as ITO, $Al_2O_3ZnO$, and SiO, and a metal nitride thin film such as SiN.

A thickness of the metal thin film is, for example, 1 nm or more, 3 nm or more, or 5 nm or more. Further, the thickness of the metal thin film is, for example, 10 μm or less, 5 μm or less, or 1 μm or less.

Among them, glass, a resin, and a silicon wafer are preferable as the adherend from a point that it is possible to peel a rigid body from the pressure-sensitive adhesive layer, which is difficult to achieve in the related art, a point that it is difficult to heat the pressure-sensitive adhesive layer with the high energy light, and the like.

The thickness of the adherend can be appropriately set depending on an intended use, and is, for example, 100 mm or less, preferably 50 mm or less, more preferably 10 mm or less, still more preferably 5 mm or less, yet still more preferably 3 mm or less, even still more preferably 1 mm or less, and particularly preferably 0.5 mm or less, from the viewpoint of reachability of the high energy light to the pressure-sensitive adhesive layer 14.

A lower limit of the thickness of the adherend is preferably 1 μm or more in the case of a film. Further, in the case of glass, 0.1 mm or more is preferable, and 0.3 mm or more is more preferable.

In the laminate 1 shown in FIG. 1, a shape of the adherend is planar, but the present invention is not limited to this form, and the shape of the adherend can freely change according to an application as long as the high energy light reaches the pressure-sensitive adhesive layer 14.

Light Irradiation Step

The peeling method according to the present embodiment includes a step of irradiating the pressure-sensitive adhesive layer with the light having the pulse width of 1 second or less and the light irradiation amount of 1,000 mJ/cm² or more. Since the light is high-energy and short-pulse light, the adherend can be peeled from the pressure-sensitive adhesive layer by decomposing or softening the pressure-sensitive adhesive layer to be irradiated with the light.

The light applied in this step preferably includes a plurality of continuous wavelength bands.

The pulse width of the light applied in this step is preferably 0.5 second or less, more preferably 0.1 second or less, still more preferably 0.05 second or less, yet still more preferably 0.01 second or less, and particularly preferably 0.001 second (1,000 μs) or less.

The number of pulses of the light irradiated in this step may be one or more than one. The number of pulses of the light irradiated in this step may be, for example, two or more, three or more, five or more, 10 or more, 100 or more, 1,000 or more, 10,000 or more, 100,000 or more, 1 million or more, or 10 million or more. Further, the number of pulses of the light to be irradiated in this step may be 10 billion or less, 1 billion or less, 100 million or less, or 10 million or less.

Here, the number of pulses of the light irradiated in the present step means the number of pulses in one time of light irradiation when the number of times of light irradiation is one, and means a sum of the number of pulses included in a plurality of times of the light irradiation when the number of times of the light irradiation is the plurality of times.

An exposure time of the light applied in this step is preferably 10 μs or more, more preferably 50 μs or more, still more preferably 100 μs or more, yet still more preferably 1,000 μs or more, and particularly preferably 10,000 μs or more.

The exposure time of the light applied in this step is preferably 100 seconds or less, more preferably 50 seconds or less, still more preferably 30 seconds or less, and particularly preferably 10 seconds or less.

Here, the exposure time means an exposure time in one time of light irradiation. That is, when one pulse is included in the one time of light irradiation, the exposure time is equal to the pulse width. When a plurality of pulses are included in the one time of light irradiation, the exposure time is equal to the sum of the pulse width and a pulse interval.

The number of times of the light irradiation applied in this step may be one, or may be a plurality of times. The number of times of the light irradiation applied in this step may be, for example, two times or more, three times or more, five times or more, or ten times or more. The number of times of light irradiation applied in this step may be, for example, 100 times or less, 80 times or less, or 50 times or less.

One pulse or a plurality of pulses may be included in the one time of light irradiation. The number of pulses included in the one time of light irradiation may be, for example, two or more, three or more, five or more, 10 or more, 100 or more, 1,000 or more, 10,000 or more, 100,000 or more, 1 million or more, or 10 million or more. Further, the number of pulses included in the one time of light irradiation may be, for example, 10 billion or less, 1 billion or less, 100 million or less, or 10 million or less.

The light applied in this step preferably has a peak top in the near-infrared region of the wavelength of 800 nm to 2,500 nm, and more preferably has a peak top in a near-infrared region having a wavelength of 800 nm to 1,500 nm, from the viewpoint that the adherend can be further easily peeled from the pressure-sensitive adhesive layer 14.

From the viewpoint that the adherend can be further easily peeled from the pressure-sensitive adhesive layer 14, the light irradiation amount of the light applied in the present step is preferably 1,000 mJ/cm² to 100,000 mJ/cm². The irradiation amount of the light applied in this step is preferably 2,000 mJ/cm² or more, more preferably 3,000 mJ/cm² or more, still more preferably 4,000 mJ/cm² or more, yet still more preferably 5,000 mJ/cm² or more, even still more preferably 7,000 mJ/cm² or more, even yet still more preferably 10,000 mJ/cm² or more, even yet still more preferably 30,000 mJ/cm² or more, and particularly preferably 50,000 mJ/cm² or more.

As a light irradiation method applied in this step, for example, a known flash lamp annealing method can be applied.

The flash lamp annealing method in the present embodiment is, for example, a method in which a xenon lamp is used as a lamp, the light having the peak top in the near-infrared region of the wavelength of 800 nm to 2,500 nm is irradiated with the pulse width of 1 second or less and the light irradiation amount of 1,000 mJ/cm² to 100,000 mJ/cm², the pressure-sensitive adhesive layer 14 is heat-treated in a short time, and the pressure-sensitive adhesive contained in the pressure-sensitive adhesive layer 14 is decomposed or softened.

According to the flash lamp annealing method, it is possible to emit the light over a wide range at a time. In principle, since an irradiation area can be increased by increasing a lamp size or increasing the number of lamps, the irradiation area is not limited.

The irradiation area is, for example, 1 cm² or more, 5 cm² or more, 10 cm² or more, 30 cm² or more, 50 cm² or more, 100 cm² or more, 300 cm² or more, 500 cm² or more, 1,000 cm² or more, or 10,000 cm² or more. The irradiation area is, for example, 1,000,000 cm² or less.

The flash lamp annealing method in the present embodiment can be performed using a commercially available apparatus, and can be performed using, for example, a batch type flash lamp irradiation apparatus (PulseForge 1300 X2 lamp, manufactured by NovaCentrix).

In the flash lamp annealing method, since a light irradiation time is very short, a material that does not absorb the light, such as glass, is not heated and is preferable. Further, since areas of the adherend and the pressure-sensitive adhesive layer is not limited in principle, it is possible to irradiate light over the wide range at a time, which is preferable.

Applications

The peeling method according to the present embodiment is suitably used for peeling applications in various fields such as automobiles, mechanical parts, electrical appliances, building materials, and the like (for example, peeling between parts, peeling between parts and a housing, and the like).

In particular, the peeling method according to the present embodiment is suitably used for an application such as peeling of a joint that requires recycling or rework, and a process material in a material manufacturing process such as a semiconductor process material, a masking material for glass, a carrier tape, and a paint protection material. Further, the method is particularly suitably used for peeling an expensive electronic component such as a liquid crystal panel, a plasma panel or an organic EL panel from a frame thereof.

In particular, the peeling method according to the present embodiment is particularly preferably used for an application in which the optical transparency is required since transmittance of the visible light region is high.

The peeling method according to the present embodiment is not limited to the above application.

EXAMPLES

Hereinafter, the present invention will be described more specifically with reference to Examples and Comparative Examples, but the present invention is not limited to the following examples. In the examples, "parts" means parts by weight.

Preparation of Pressure-sensitive Adhesive Layer 65 parts of butyl acrylate (BA), 15 parts of N-vinyl pyrrolidone (NVP), 20 parts of 4-hydroxybutyl acrylate (4HBA) as monomer components, 0.1 parts of α-thioglycerol as a chain transfer agent, and 122 parts of ethyl acetate as a polymerization solvent were charged into a reaction vessel equipped with a cooling pipe, a nitrogen introducing pipe, a thermometer, and a stirrer, and 0.2 parts of 2,2'-azobisisobutyronitrile (AIBN) as a thermal polymerization initiator is added and solution polymerization was carried out under a nitrogen atmosphere to obtain a solution containing an acrylic polymer.

2 parts of dipentaerythritol hexaacrylate (DPHA), 0.2 parts of Omnirad (Irgacure) 184, and 0.1 parts of Takenate D110N manufactured by Mitsui Chemicals Inc. were added to the solution containing the obtained acrylic polymer to obtain a base pressure-sensitive adhesive. Trade name CIR-RL or CIR-FS265 manufactured by Japan Calit Co., Ltd., which is a diimmonium-based dye as a near-infrared absorbing dye, or carbon black (DENKA BLACK, which is a 100% pressed product and manufactured by Denka Company Limited) was added to 100 parts of the base pressure-sensitive adhesive at a ratio shown in Table 1, and then was defoamed to obtain various acrylic pressure-sensitive adhesive compositions. "–" in Table 1 means that the component is not contained.

Each of the obtained various acrylic pressure-sensitive adhesive compositions was applied onto a polyethylene terephthalate film (product name "MRF#38" manufactured by Mitsubishi Chemical Co., Ltd.) having a thickness of 38 µm, one surface of which had been subjected to a release treatment with silicone, using an applicator such that a thickness is 50 µm at the time of drying to form a coating layer.

Next, the coating layer was placed in a dryer at 130° C. for 3 minutes to be dried, and after being taken out from the dryer, the coating layer was coated such that a release-treated surface of the polyethylene terephthalate film (product name "MRE#38" manufactured by Mitsubishi Chemical Co., Ltd.) having the thickness of 38 µm, one surface of which had been subjected to the release treatment with silicone, was on a coating layer side, thereby obtaining various pressure-sensitive adhesive sheets (pressure-sensitive adhesive layer thickness: 50 µm) each having a thickness of 50 µm as pressure-sensitive adhesive layers.

In the same manner as described above, various pressure-sensitive adhesive sheets (pressure-sensitive adhesive layer thickness: 150 µm) each having a thickness of 150 µm were also prepared as the pressure-sensitive adhesive layers.

Measurement of Minimum Transmittance and Maximum Transmittance

In the present embodiment, the minimum transmittance in the near-infrared region of the wavelength of 800 nm to 2,500 nm and the maximum transmittance in the visible light region of the wavelength of 380 nm to 780 nm were measured as follows.

A release liner on one side of each of the obtained various pressure-sensitive adhesive sheets was peeled off, and the pressure-sensitive adhesive sheet was attached to non-alkali glass (Eagle XG manufactured by Corning Inc., size: 45 mm×50 mm×thickness 0.7 mm) with a hand roller. Next, a release liner on the other surface was peeled off, and the pressure-sensitive adhesive sheet was attached to another non-alkali glass similar to the above with the hand roller. An obtained test piece was subjected to an autoclave treatment at 50° C. and 5 atm for 15 minutes to bring the pressure-sensitive adhesive layer into close contact with the glass. This test piece was irradiated with light of 3,000 mJ/cm$^2$ in terms of UVA from a high-pressure mercury lamp, and the pressure-sensitive adhesive layer was post-cured to obtain the measurement sample. Thereafter, with respect to this measurement sample, an ultraviolet-visible-infrared spectrophotometer UH-4150 (manufactured by Hitachi High-Technologies Corporation) was used, and a transmission spectrum was measured using air as a background under conditions of a wavelength range of 380 nm to 2,500 nm and a step width of 1 nm using an integrating sphere unit. From the obtained spectrum, the minimum transmittance (Tmin) in the near-infrared region of the wavelength of 800 nm to 2,500 nm and the maximum transmittance (Tmax) in the visible light region of the wavelength of 380 nm to 780 nm were calculated.

Figure 2:
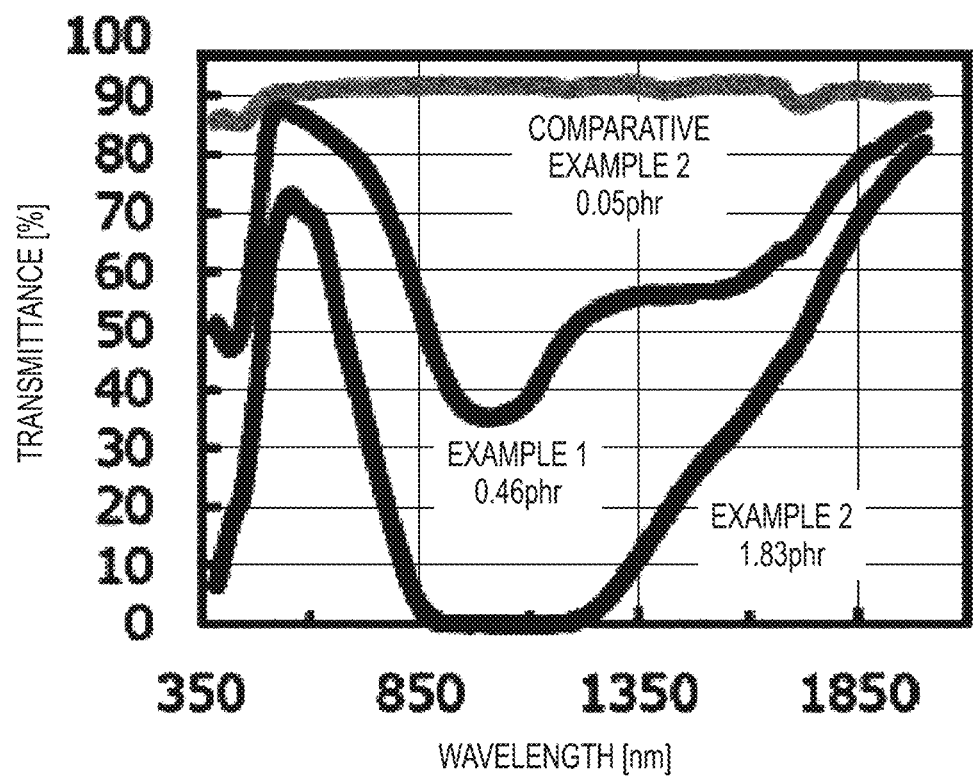
FIG. 2 is a diagram showing a transmission spectrum of measurement samples each using a pressure-sensitive adhesive sheet having a pressure-sensitive adhesive layer thickness of 50 μm in a part of Examples and Comparative Examples.
Figure 3:
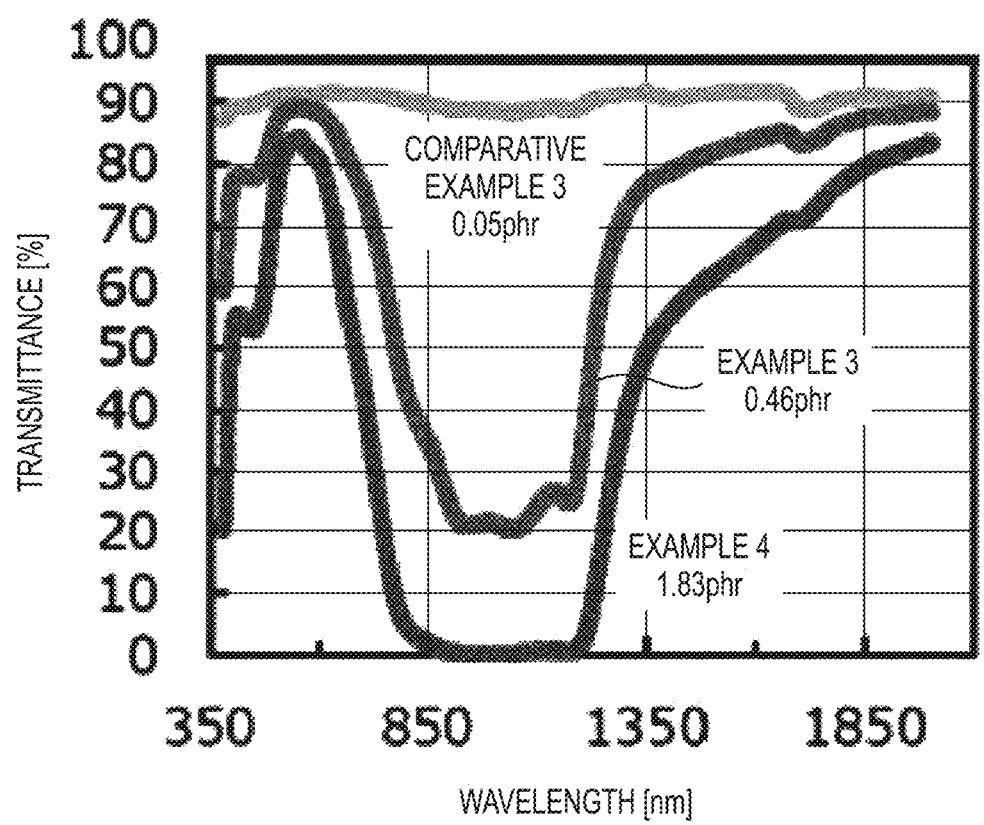
FIG. 3 is a diagram showing a transmission spectrum of measurement samples each using a pressure-sensitive adhesive sheet having a pressure-sensitive adhesive layer thickness of 50 μm in a part of Examples and Comparative Examples.
Figure 4:
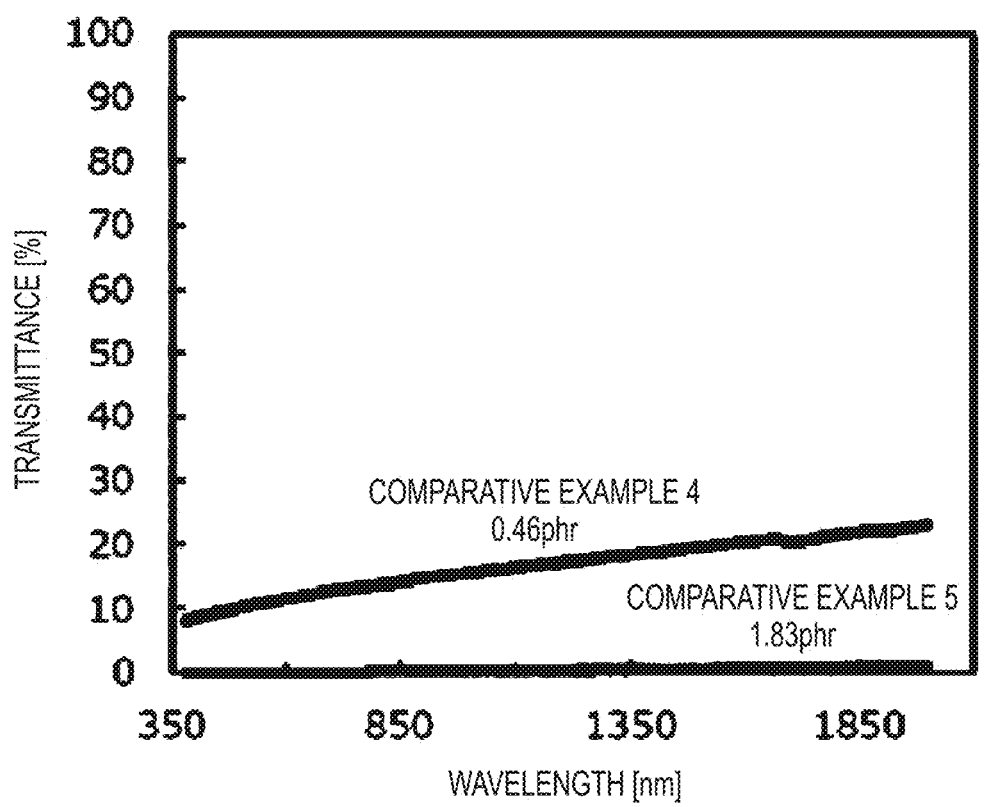
FIG. 4 is a diagram showing a transmission spectrum of measurement samples each using a pressure-sensitive adhesive sheet having a pressure-sensitive adhesive layer thickness of 50 μm in Comparative Examples.

The results are shown in Table 1. Further, FIGS. 2 to 4 are diagrams showing transmission spectra of measurement samples using the pressure-sensitive adhesive sheets each having the pressure-sensitive adhesive layer thickness of 50 µm in a part of Examples and Comparative Examples shown in Table 1. FIG. 2 is a diagram showing a transmission spectrum in the case in which the trade name: CIR-RL manufactured by Japan Calit Co., Ltd. is used as the near-infrared absorbing dye. FIG. 3 is a diagram showing a transmission spectrum in the case in which the trade name: CIR-FS265 manufactured by Japan Calit Co., Ltd. is used as the near-infrared absorbing dye. FIG. 4 is a diagram showing a transmission spectrum when carbon black is used as a dye.

Peeling of Adherend from Pressure-Sensitive Adhesive Layer by Flash Lamp Annealing Method Each of the various pressure-sensitive adhesive sheets obtained above was cut into a size of 100 mm×70 mm, the release liner on the one surface of each pressure-sensitive adhesive sheet was peeled off, and the pressure-sensitive adhesive sheet was attached to Gorilla glass 3 (size: 120 mm×75 mm x thickness 0.7 mm) manufactured by Corning Inc. with the hand roller. Next, the release liner on the other surface was peeled off, and the pressure-sensitive adhesive sheet was attached to another Gorilla glass similar to the above with the hand roller. An obtained test piece was subjected to the autoclave treatment at 50° C. and 5 atm for 15 minutes to bring the pressure-sensitive adhesive layer into close contact with the glass. This test piece was irradiated with the light of 3,000 mJ/cm$^2$ in terms of UVA from the high-pressure mercury lamp, and the pressure-sensitive adhesive was post-cured.

This test piece was irradiated with xenon flash light once under conditions of a lamp irradiation range of 150 mm×75 mm, a lamp height of 10 mm, an applied voltage of 600 V, a pulse width of 3,000 μs, a light irradiation amount of 17,000 mJ/cm$^2$, and a lamp irradiation time (exposure time) of 0.003 second using a batch type flash lamp irradiation apparatus (PulseForge 1300 X2 lamp, manufactured by NovaCentrix). The peak top of the wavelength of the xenon flash light is 880 nm. After the flash light irradiation, a case in which the glass of the test piece and the pressure-sensitive adhesive layer were peeled was evaluated as "Good" for the peelability at the time of light irradiation", and a case in which the glass and the pressure-sensitive adhesive layer were not peeled was evaluated as "Bad" for the peelability at the time of light irradiation". The results are shown in Table 1.

From the results shown in Table 1, in each of Examples, the pressure-sensitive adhesive layer was irradiated with light having a pulse width of 1 second or less and a light irradiation amount of 1,000 mJ/cm$^2$ or more, and the pressure-sensitive adhesive layer satisfied both conditions that (1) the minimum transmittance is 75% or less, and (2) the value obtained by dividing the maximum transmittance by the minimum transmittance is 1.15 or more, and thus the peelability at the time of light irradiation was good.

On the other hand, Comparative Examples 1 to 3 did not satisfy the conditions (1) and (2), and thus the peelability at the time of light irradiation was evaluated as "Bad".

In Comparative Examples 4 and 5, although the results show that the peelability at the time of light irradiation is good, since carbon black was used as the dye, optical transparency of the pressure-sensitive adhesive sheet deteriorated in the visible light region.

Figure 5A:
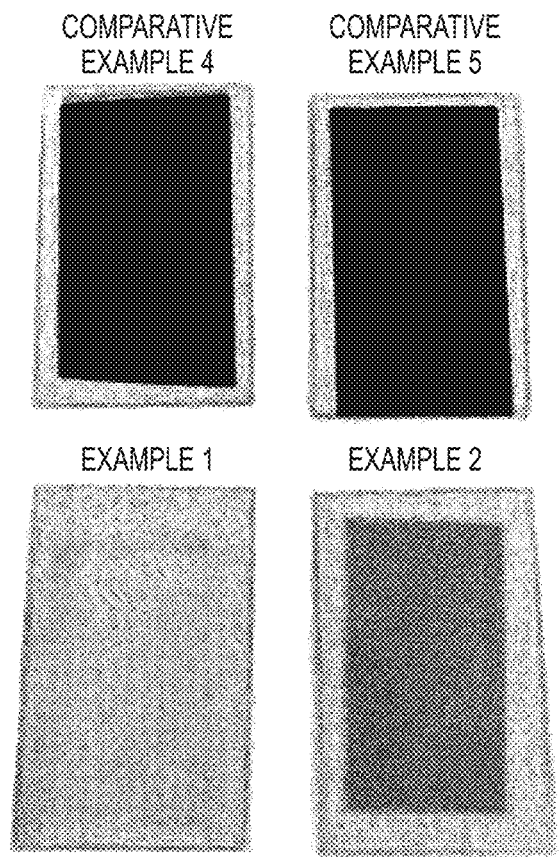
FIG. 5A shows photographs illustrating optical transparency of measurement samples used in a part of Examples and Comparative Examples.

FIG. 5A is a plan view (photograph) of measurement samples using pressure-sensitive adhesive sheets each having the pressure-sensitive adhesive layer thickness of 50 μm, which were used in Examples 1 and 2 and Comparative Examples 4 and 5. While the measurement samples of Comparative Examples 4 and 5 using carbon black were blackened, the measurement samples of Examples 1 and 2 were slightly colored, but exhibited good light transmittance in the visible light region.

Figure 5B:
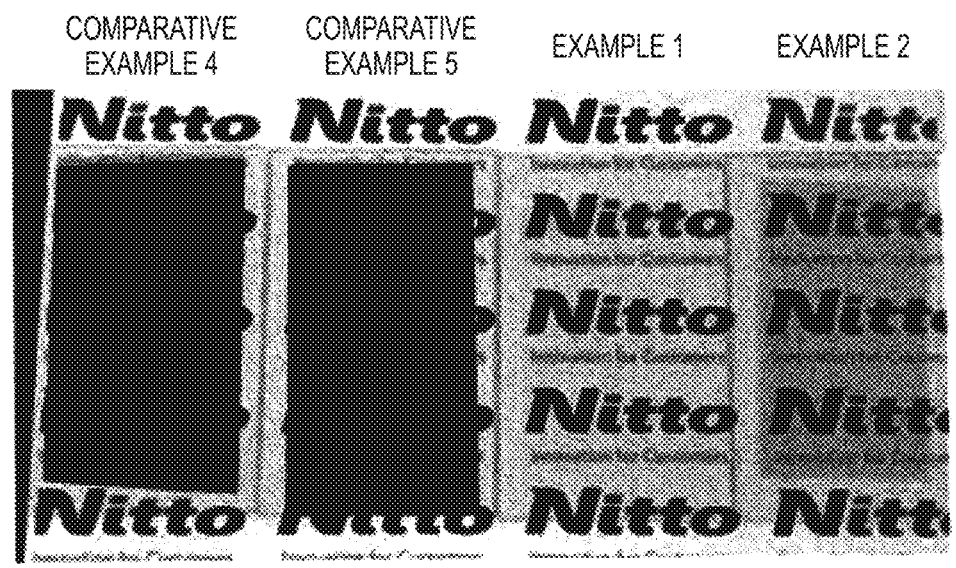
FIG. 5B shows photographs illustrating optical transparency of measurement samples used in a part of Examples and Comparative Examples.

FIG. 5B shows an example in which paper surfaces on each of which characters are printed are placed under the measurement samples, respectively. With reference to FIG. 5B, a difference in optical transparency in the visible light region between the measurement samples of Examples and Comparative Examples was also clear.

Although various embodiments have been described above with reference to the drawings, it is needless to say that the present invention is not limited to such examples. It

TABLE 1

Unit: prats by weight

| | | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| | Base adhesive | 100 | 100 | 100 | 100 | 100 | 100 | 100 | 100 | 100 |
| Near-infrared absorbing dye 1 | CIR-RL | 0.46 | 1.83 | — | — | — | 0.05 | — | — | — |
| Near-infrared absorbing dye 2 | CIR-FS265 | — | — | 0.46 | 1.83 | — | — | 0.05 | — | — |
| Carbon black | DENKA BLACK 100% pressed | — | — | — | — | — | — | — | 0.46 | 1.83 |
| When pressure-sensitive adhesive layer thickness is 50 μm | Maximum transmittance in visible light region of 380 nm to 780 nm Tmax [%] | 87.8 | 72.8 | 89.3 | 84.2 | 92.0 | 92.0 | 91.6 | 13.6 | 0.2 |
| | Minimum transmittance in near-infrared region of 800 nm to 2,500 nm Tmin [%] | 35.0 | 0.2 | 20.5 | 0.3 | 92.0 | 88.4 | 83.3 | 13.8 | 0.21 |
| | Tmax/Tmin | 2.51 | 364 | 4.36 | 281 | 1.00 | 1.04 | 1.04 | 0.99 | 0.95 |
| | Peelability at the time of light irradiation | Good | Good | Good | Good | Bad | Bad | Bad | Good | Good |
| When pressure-sensitive adhesive layer thickness is 150 μm | Maximum transmittance in visible light region of 380 nm to 780 nm Tmax [%] | 80.2 | 46.0 | 84.4 | 69.9 | 92.0 | 90.9 | 91.1 | 0.31 | 0.01 |
| | Minimum transmittance in near-infrared region of 800 nm to 2,500 nm Tmin [%] | 4.6 | 0.01 | 1.5 | 0.01 | 92.0 | 82.2 | 82.9 | 0.32 | 0.01 |
| | Tmax/Tmin | 17.4 | 4600 | 56.3 | 6990 | 1.00 | 1.11 | 1.10 | 0.97 | 1.00 |
| | Peelability at the time of light irradiation | Good | Good | Good | Good | Bad | Bad | Bad | Good | Good |

REFERENCE SIGNS LIST 1 laminate
12,16 adherend
14 pressure-sensitive adhesive layer

The invention claimed is:

1. A method for peeling an adherend from a pressure-sensitive adhesive layer by irradiating a laminate in which the pressure-sensitive adhesive layer and the adherend are laminated with light, the method comprising:
   a step of irradiating the pressure-sensitive adhesive layer with the light having a pulse width of 1 second or less and a light irradiation amount of 1,000 mJ/cm$^2$ or more, wherein
   the pressure-sensitive adhesive layer satisfies the following conditions (1) and (2) in terms of a minimum transmittance in a near-infrared region of a wavelength of 800 nm to 2,500 nm and a maximum transmittance in a visible light region of a wavelength of 380 nm to 780 nm, which are measured using a measurement sample in which a first non-alkali glass having a thickness of 0.7 mm is bonded to a first pressure-sensitive adhesive surface of the pressure-sensitive adhesive layer and a second non-alkali glass having a thickness of 0.7 mm is bonded to a second pressure-sensitive adhesive surface of the pressure-sensitive adhesive layer with the pressure-sensitive adhesive layer interposed between the first non-alkali glass and the second non-alkali glass:
   (1) the minimum transmittance is 75% or less, and
   (2) a value obtained by dividing the maximum transmittance by the minimum transmittance is 1.15 or more.

2. The peeling method according to claim 1, wherein the light is emitted a plurality of times.

3. The peeling method according to claim 1, wherein the light has a peak top in the near-infrared region of the wavelength of 800 nm to 2,500 nm.

4. The peeling method according to claim 1, wherein the light irradiation amount of the light is 1,000 mJ/cm$^2$ to 100,000 mJ/cm$^2$.

5. The peeling method according to claim 1, wherein the pressure-sensitive adhesive layer contains an acrylic pressure-sensitive adhesive.

6. The peeling method according to claim 1, wherein the pressure-sensitive adhesive layer contains a near-infrared absorbing material.

7. The peeling method according to claim 6, wherein the near-infrared absorbing material is a near-infrared absorbing dye.

* * * * *